United States Patent
Shen

(10) Patent No.: US 8,113,493 B2
(45) Date of Patent: Feb. 14, 2012

(54) RESILIENT DEVICE

(75) Inventor: Wen-Bin Shen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 594 days.

(21) Appl. No.: 12/251,431

(22) Filed: Oct. 14, 2008

(65) Prior Publication Data

US 2010/0044936 A1   Feb. 25, 2010

(30) Foreign Application Priority Data

Aug. 20, 2008   (TW) .................. 200820301883 U

(51) Int. Cl.
*H04M 1/02* (2006.01)

(52) U.S. Cl. ................ 267/70; 455/90.3; 455/575.1
(58) Field of Classification Search ............ 267/70–72, 267/80, 166, 169, 170, 286, 289; 455/575.1–575.4, 455/90.3; 16/304–306; *H04M 1/02*
See application file for complete search history.

(56) References Cited

U.S. PATENT DOCUMENTS

| 2007/0155451 A1* | 7/2007 | Lee ............................. 455/575.4 |
| 2007/0218963 A1* | 9/2007 | Kim ........................... 455/575.4 |
| 2007/0249394 A1* | 10/2007 | Bong Doo ................. 455/556.1 |
| 2008/0058039 A1* | 3/2008 | Lee et al. ................... 455/575.4 |
| 2008/0254844 A1* | 10/2008 | Lee ............................. 455/575.4 |

FOREIGN PATENT DOCUMENTS

KR   20-0400694 Y1 * 11/2005
WO   WO 2008123664 A1 * 10/2008

* cited by examiner

*Primary Examiner* — Robert Siconolfi
*Assistant Examiner* — Stephen Bowes
(74) *Attorney, Agent, or Firm* — Altis Law Group, Inc.

(57) ABSTRACT

A resilient device includes a fixing member defining two sliding holes, two slide members slidably mounted to opposite sides of the fixing member, and a number of elastic members. Each slide member includes a protrusion engagable in a corresponding sliding hole. The fixing member includes at least one receiving portion for receiving the elastic members, and the elastic members are disposed between the slide members and separated by the slide members. Therefore, each elastic member is positioned to resist against the slide members for biasing the slide members.

5 Claims, 3 Drawing Sheets

RESILIENT DEVICE

BACKGROUND

1. Technical Field

The present disclosure relates to resilient devices and, particularly, to a resilient device for providing enough force without interference of elastic members thereof.

2. Description of Related Art

Traditionally, a resilient device is utilized in an apparatus for returning a member of the apparatus to an original position/state. Nowadays, the resilient device is normally a spring. However, much force is required to bias the member, so that a plurality of springs are connected in parallel between the member and the apparatus to obtain enough force. However, the springs need to be connected to the member and the apparatus one by one, resulting in laborious and time-consuming. Moreover, the springs may tangle with one another to cause interference.

DETAILED DESCRIPTION

Figure 1:
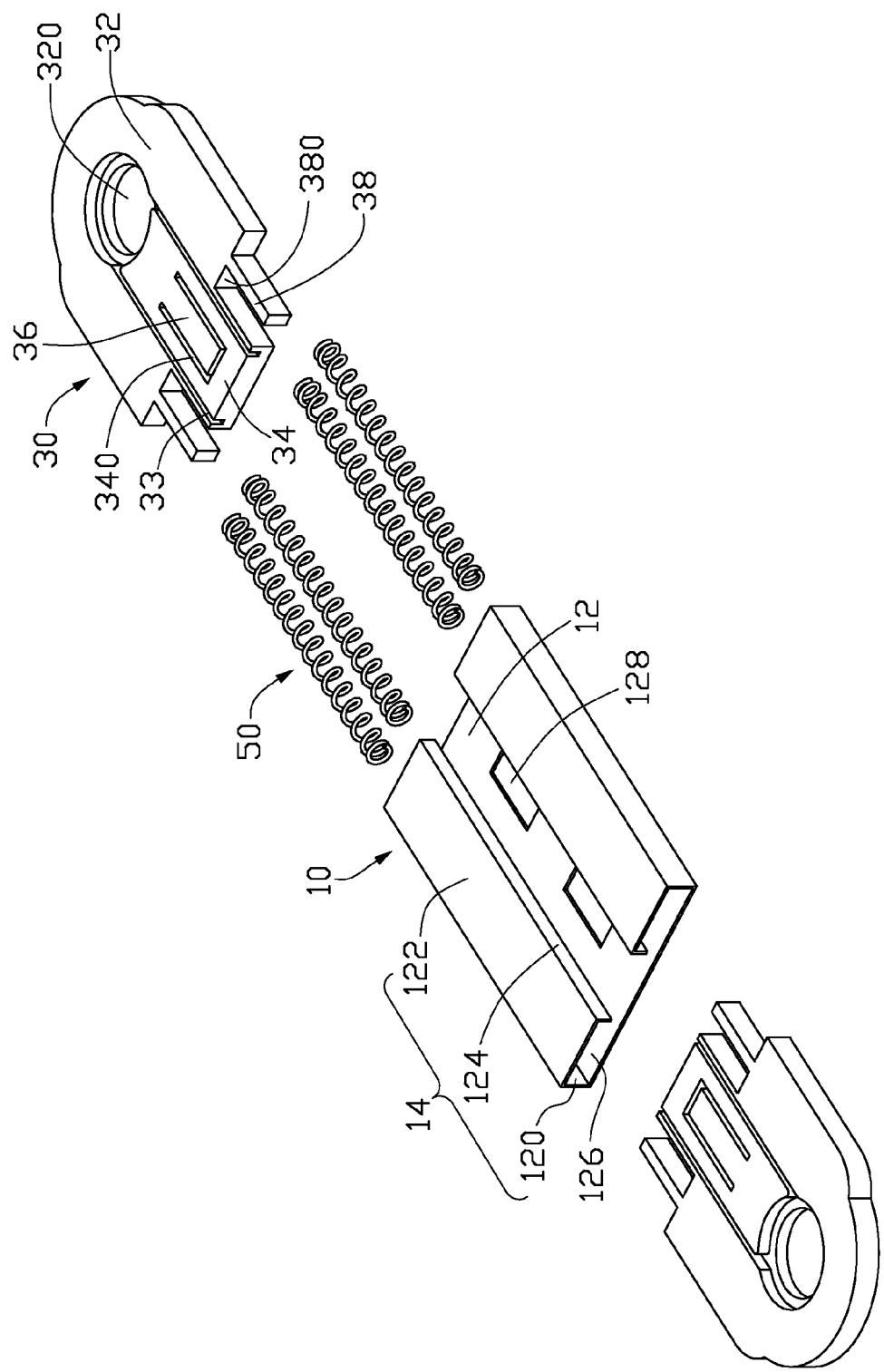
FIG. 1 is an exploded, isometric view of an embodiment of a resilient device.
Figure 2:
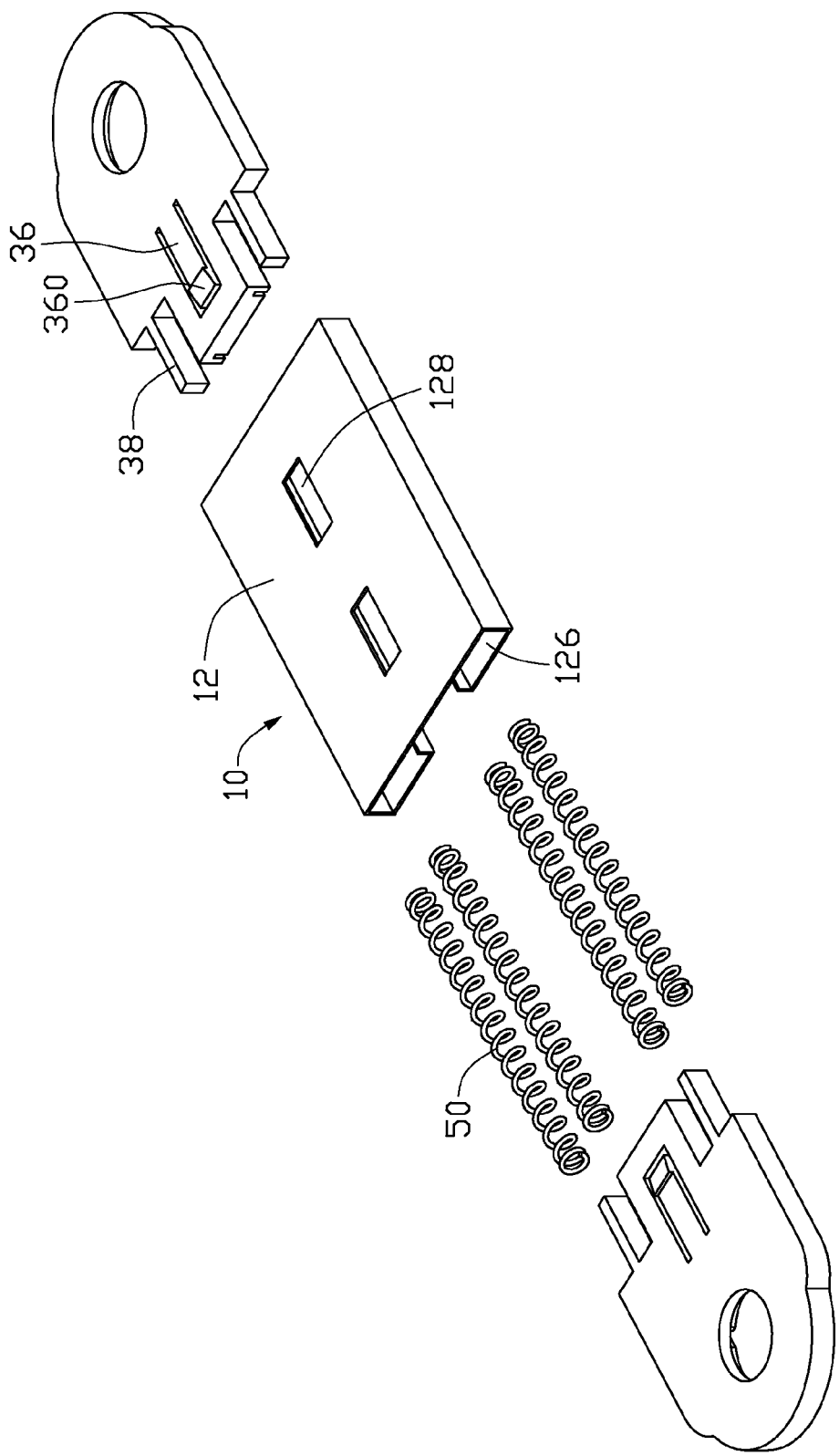
FIG. 2 is an inverted view of FIG. 1.

Referring to FIGS. 1 and 2, an exemplary embodiment of a resilient device includes a fixing member 10, two slide members 30 slidably mounted to opposite ends of the fixing member 10 respectively, and four elastic members 50.

The fixing member 10 includes a longitudinal fixing board 12, and two U-shaped receiving portions 14 longitudinally positioned at opposite ends of the fixing board 12 respectively, facing the same direction. The fixing board 12 defines two longitudinal sliding holes 128 aligned with each other. Each receiving portion 14 includes a sidewall 120 perpendicularly extending upward from one side of the fixing board 12, a resisting board 122 perpendicularly extending from a free side of the sidewall 120 toward the other side of the opposite side of the fixing board 12, and a guiding board 124 perpendicularly extending down from a distal side of the resisting board 122. A receiving room 126 is formed bounded by the guiding board 124, the resisting board 122, the sidewall 120, and the side of the fixing board 12 correspondingly.

Each slide member 30 includes a connecting portion 32 and a securing portion 34 longitudinally extending from a middle portion of a first end of the connecting portion 32. The connecting portion 32 defines a fixing hole 320 for fixing the connecting portion 32 to a member (not shown) of an apparatus (not shown) that utilizes the present resilient device. Two fixing posts 38 located at opposite sides of the securing portion 34 extend from the first end of the connecting portion 32, respectively. As a result, two resisting surfaces 380 are formed on an end surface of the first end of the connecting portion 32, located at opposite sides of each fixing post 38. The securing portion 34 defines two guiding slots 33 longitudinally extending to communicate with the fixing hole 320. The securing portion 34 defines a U-shaped slot 340, with an elastic tab 36 formed in the slot 340. A protrusion 360 protrudes from a distal end of the elastic tab 36.

In the illustrated embodiment, each elastic member 50 is a helical spring.

Figure 3:
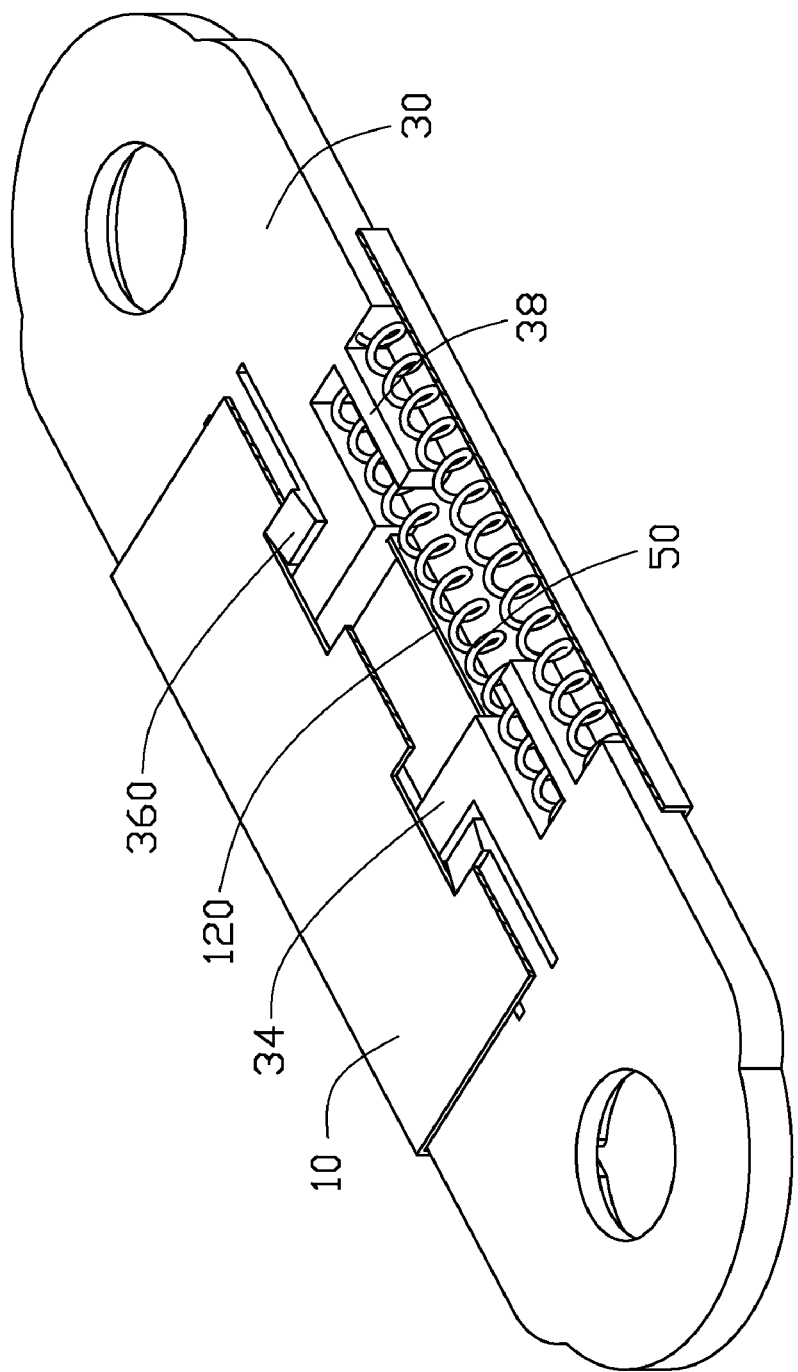
FIG. 3 is an assembled, partially cutaway view of FIG. 2.

Referring to FIG. 3, in assembly, each receiving room 126 receives two elastic members 50. Each slide member 30 is mounted to a corresponding end of the fixing member 10, with the fixing posts 38 received in the corresponding receiving rooms 126, and the guiding boards 124 slid into the corresponding guiding slots 33. As a result, the slide members 30 are capable of sliding along the guiding boards 124 towards each other until the protrusions 360 of the slide members 30 are engaged in the sliding holes 128 of the fixing board 12 correspondingly. When the protrusions 360 are in the sliding holes 128, two elastic members 50 are located at opposite sides of each fixing post 38. Two elastic members 50 are deformed, and opposite ends of each elastic member 50 resist against the corresponding resisting surfaces 380 of the slide members 30. As a result, each protrusion 360 tightly hooks onto the edge of the sliding holes 128 correspondingly.

In use, the resilient device is connected between two members of the apparatus via the fixing holes 320. When the members are moved toward each other, the slide members 30 are slid towards each other along the guiding boards 124. Correspondingly, the protrusions 360 are slid in the corresponding sliding holes 128 toward each other until the elastic members 50 cannot be deformed any further. When the members are released, the elastic members 50 return to a free state, thereby producing an elastic force pushing the slide members 30 to move away from each other. Correspondingly, the protrusions 360 are slid away from each other in the corresponding sliding holes 128 until firmly hooking onto the edge of sliding holes 128 correspondingly.

According to the above-mentioned embodiments, it is obvious that the fixing member 10 and the two slide members 30 are cooperatively configured to separate the elastic members 50, and prevent the elastic members 50 from interfering with one another. Correspondingly, the plurality of elastic members 50 able to work together for obtaining much force and meanwhile free of interference with each other.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments.

What is claimed is:

1. A resilient device comprising:

a fixing member comprising a fixing board, and two receiving portions disposed on two opposite sides of the fixing board, wherein the fixing board defines two sliding holes between the receiving portions, each of the receiving portions comprises a receiving room;

two slide members aligning with each other and slidably mounted to two opposite ends of the fixing member respectively, wherein each of the slide members comprises a connecting portion and a securing portion longitudinally extending from a middle portion of a first end of the connecting portion, and two fixing posts located at opposite sides of the securing portion and extending from the first end of the connecting portion; wherein the securing portion defines a U-shaped slot to form an elastic tab, a protrusion protrudes from a distal end of the elastic tab to be slidably engaged in a corresponding one of the sliding holes, and each of the fixing posts is received in the corresponding receiving room; and a plurality of elastic members, received in the receiving portions of the fixing member, disposed between the slide members and separated by the fixing posts, wherein two opposite ends of each of the elastic members are positioned to respectively resist against the two slide members for biasing the slide members.

2. The resilient device of claim 1, wherein two resisting surfaces are formed on an end surface of the first end of the connecting portion, respectively positioned at opposite sides of each of the two fixing posts, opposite ends of each elastic member resists against the corresponding resisting surfaces of the slide members.

3. The resilient device of claim 1, wherein each of the receiving portions comprises a sidewall perpendicularly extending from one side of the fixing board, a resisting board perpendicularly extending from a distal side of the sidewall towards the other side of the fixing board, and a guiding board perpendicularly extending from a distal side of the resisting board towards the fixing board.

4. The resilient device of claim 3, wherein the securing portion of each slide member defines two guiding slots longitudinally extending to the connecting portion, the guiding boards are engagable in and slidable along the guiding slots correspondingly.

5. The resilient device of claim 1, wherein the sliding holes align with each other.

* * * * *